July 10, 1956  D. H. MATTINSON  2,753,685
GAS TURBINE ENGINE WITH EXHAUST GAS HEATING MEANS
Filed July 24, 1952  2 Sheets-Sheet 1
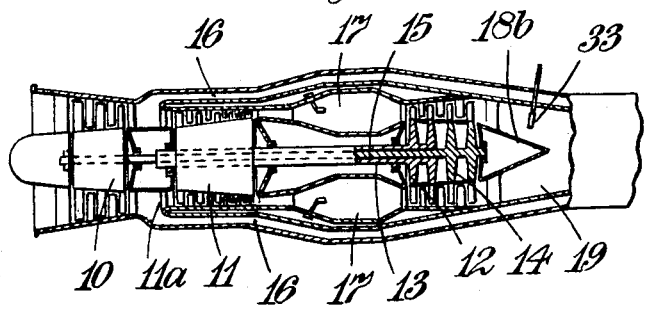
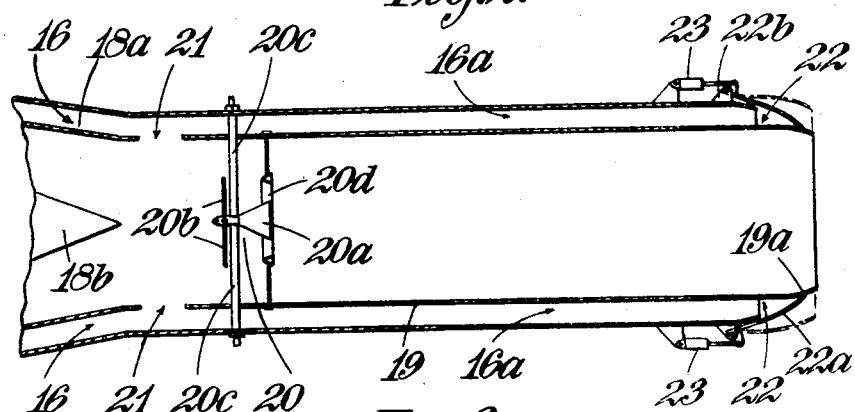
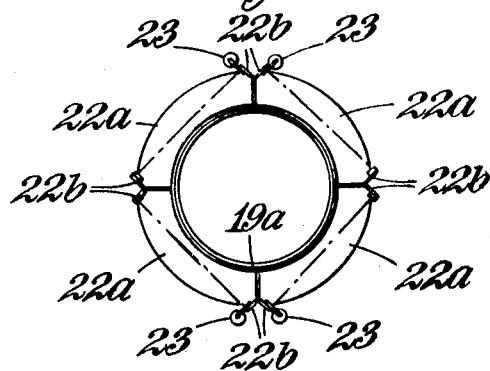
INVENTOR
D. H. MATTINSON
BY
Wilkinson & Mawhinney
ATTYS.

July 10, 1956  D. H. MATTINSON  2,753,685
GAS TURBINE ENGINE WITH EXHAUST GAS HEATING MEANS
Filed July 24, 1952  2 Sheets-Sheet 2
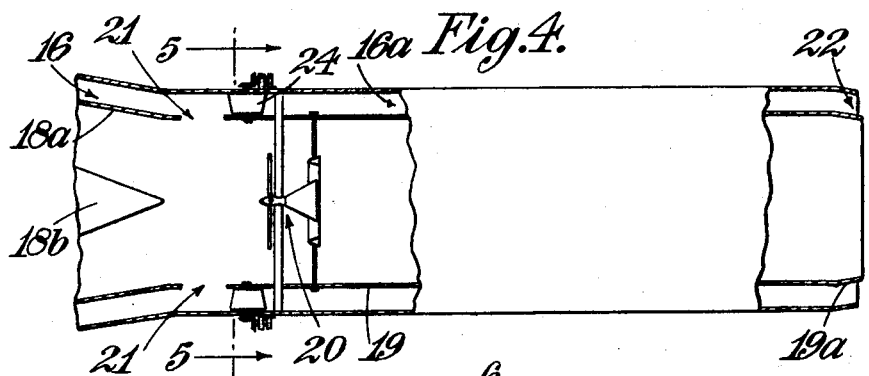
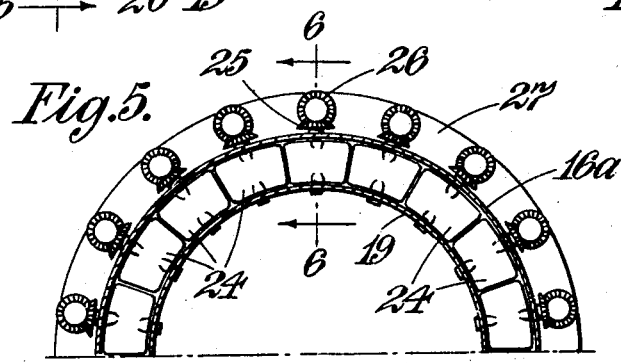
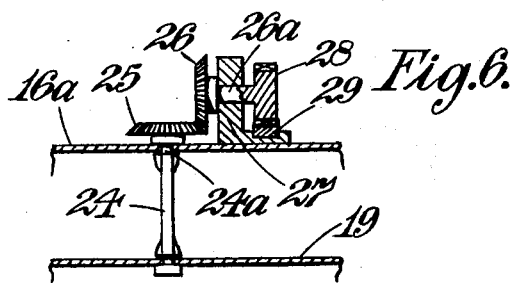
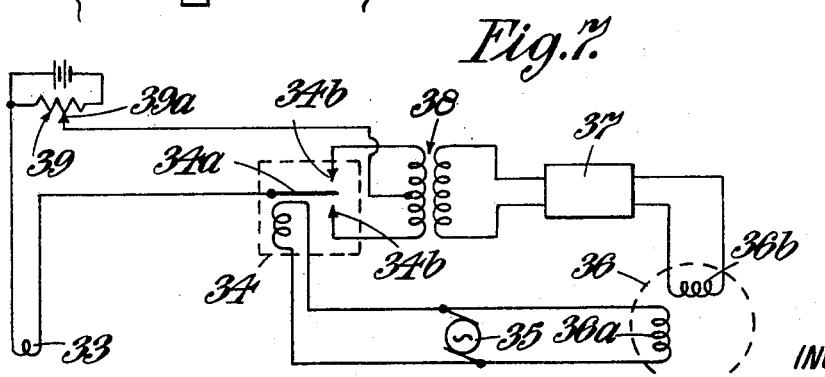
INVENTOR
D. H. MATTINSON
BY
Wilkinson & Mawhinney
ATTYS.

United States Patent Office 2,753,685
Patented July 10, 1956

2,753,685

GAS TURBINE ENGINE WITH EXHAUST GAS HEATING MEANS

Donald Hamilton Mattinson, Derby, England, assignor to Rolls-Royce Limited, Derby, England, a British company Application July 24, 1952, Serial No. 300,595

Claims priority, application Great Britain August 2, 1951

9 Claims. (Cl. 60—35.6)

This invention relates to gas-turbine engines and is more particularly concerned with engines of the type hereinafter referred to as "by-pass engines." A by-pass engine is one which comprises a compressor system having a low-pressure compressor section from which air is delivered partly to a high-pressure compressor section and partly to a flow passage which by-passes the high-pressure compressor section and also the combustion equipment receiving air compressed in the high-pressure compressor section and a turbine system which receives the products of combustion from said combination equipment, and in which the by-passed air flowing in said passage and the exhaust gases from said turbine system are passed to atmosphere through propelling nozzle means to provide propulsive thrust.

In gas-turbine engines used for aircraft propulsion, it is known to burn additional fuel in the exhaust gas passing from the turbine to atmosphere in order to augment the propulsive thrust of the engine, and the present invention is concerned with by-pass engines having additional combustion equipment for this purpose.

According to the present invention, a gas-turbine by-pass engine having additional combustion equipment for the purpose of reheating the turbine exhaust gases passing to atmosphere, is characterized in that ducting affording the by-pass air flow passage is provided with a direct outlet to atmosphere for by-pass air and with a connection to the jet pipe forming the exhaust gas passage and in that there is provided gas flow control means to control the flow of by-pass air to said direct outlet and through said connection so that by-pass air mixes with the turbine exhaust gas in the jet pipe when the additional combustion equipment is inoperative, and flows in part at least through said direct outlet when the additional combustion equipment is operative.

When additional combustion equipment is operative, there is normally an increase both of the static pressure within the jet pipe and of the gas temperature within the jet pipe. The increase of pressure and temperature has been avoided hitherto by using an adjustable propelling nozzle for the turbine exhaust gases and adjusting this nozzle to increase the effective area thereof when the additional combustion equipment is operative.

The present invention, however, provides an arrangement by which the pressure and temperature within the jet pipe immediately downstream of the turbine system may be controlled without the need for a variable-area propelling nozzle for the jet pipe through which the main stream of reheated turbine exhaust gases passes to atmosphere.

According to a feature of the invention, the connection between the ducting for the by-pass air and the jet-pipe may be upstream of the additional combustion equipment. This arrangement has the advantage that the movable parts of the flow controlling means will not be subjected to the high-temperature exhaust gases resulting from operation of the additional combustion equipment.

The gas flow control means may take a number of different forms. Thus in one preferred arrangement, the gas flow control means comprises a variable-area propelling nozzle at the direct outlet to atmosphere from the ducting conveying by-passed air. The design of the nozzle does not present the same difficulties as are experienced in the design of a variable-area propelling nozzle at the end of the jet-pipe since the temperature of the gases flowing through the direct outlet will be low compared with those of the reheated exhaust gases flowing in the jet-pipe. The variable-area propelling nozzle will usually fully close the direct outlet when the additional combustion equipment is inoperative so that the whole of the by-pass air flows into the jet-pipe. Such a variable-area nozzle may be of the kind having two operative positions, i. e. open and closed; alternatively it may be adjustable to provide a number of selectable intermediate positions or it may be progressively adjustable as between the open and closed positions.

In another arrangement the gas flow control means comprises a valve mechanism located in the ducting itself, there being free communication upstream of the valve between the ducting and the jet-pipe. When the valve mechanism is closed for normal operation of the engine, the by-pass air flows into the jet-pipe to mix with the turbine exhaust gases and, when the valve device is open, the by-pass air will be in part at least permitted to flow into the ducting and thence to the direct outlet to atmosphere without mixing with the main stream of turbine exhaust gas. The valve mechanism in such a construction may comprise a ring of vanes rotatable about their radial axes or pivoted flaps which lie against a wall of the ducting when inopertaive.

If desired an adjustable nozzle may be provided at the direct outlet in addition to valve means in the ducting.

The gas flow control means may be adjusted by means including a temperature sensitive device preferably located in the turbine exhaust gas stream upstream of the additional combustion equipment, whereby when a predetermined maximum temperature is reached in operation of the additional combustion equipment the flow of by-passed air through the direct outlet is permitted to increase, for example by progressively opening the variable-area nozzle above described, thereby reducing the temperature in the exhaust ducting on the downstream side of the turbine system.

Some constructional arrangements according to this invention will now be described with reference to the accompanying drawings, in which Figure 1 is a diagrammatic illustration of one form of by-pass type gas-turbine engine to which the invention is applicable.

Figure 2 illustrates one arrangement according to the invention,

Figure 3 is an end view of Figure 1 looking from the right,

Figure 4 illustrates a second arrangement according to the invention,

Figure 5 is a section on the line 5—5 of Figure 4 to a larger scale,

Figure 6 is a section on the line 6—6 of Figure 5 to a larger scale, and

Figure 7 is a diagram of a temperature-sensitive control suitable for use with the invention.

Referring to Figure 1, the gas-turbine by-pass engine illustrated comprises two independently-rotating, coaxial compressor sections, namely, a low-pressure section 10 and a high-pressure section 11. The high-pressure compressor section 10 is driven by an axial-flow high-pressure turbine 12 through a shaft 13 and the low-pressure compressor section 10 is driven by an axial-flow low-pressure turbine 14 through a shaft 15 nested in the shaft 13.

The low-pressure compressor section has a delivery which communicates with the entry 11a of the high-pressure compressor section 11 of the compressor and also with by-pass ducting 16 which is generally of annular cross-section and surrounds the high-pressure compressor section 11.

The high-pressure compressor section 11 delivers compressed air to combustion equipment 17 of any convenient kind disposed around the driving shafts 15, 13 interconnecting the compressor sections 10, 11 and turbines 14, 12, and the by-pass ducting 16 affording the annular by-pass flow passage extends axially beyond and externally around both the combustion equipment 17 and the turbine system 12, 14.

The exhaust gases from the turbine system 12, 14 pass into an exhaust unit comprising in known manner an outer duct wall 18a and an inner conical structure 18b, so that the exhaust gases on leaving the turbine system enter an annular passage which merges into a circular exhaust passage at the apex of the conical structure 18b. The exhaust gases pass from the exhaust unit into a jet-pipe 19 having a propelling nozzle 19a at its end.

With gas-turbine engines such as the gas-turbine engine just described it is sometimes desirable to increase the thrust developed by the engine, and for this purpose there may be provided in the jet-pipe 19 (Figure 2) means 20 to supply fuel to be burnt with the stream of exhaust gases flowing in the jet-pipe 19.

This invention is concerned only with gas-turbine engines having means for reheating the exhaust gases in the jet-pipe.

In Figure 2 the means 20 to supply fuel into the jet-pipe is of an hitherto proposed construction and comprises a pilot fuel arrangement 20a, a main fuel supply arrangement comprising a number of radially-extending delivery tubes 20b, the fuel for the pilot flame arrangement 20a and for the delivery tubes 20b being supplied through struts 20c which also support the arrangement within the jet-pipe, and a flame stabilising device such as a U-section baffle 20d.

When fuel is being burnt in the jet-pipe, the pressure and temperature within the jet-pipe upstream of the fuel supply means 20 tends to increase and it is usual to provide at the outlet end of the jet-pipe an adjustable nozzle so that the effective area of the nozzle can be increased when the fuel supply means 20 is operative thereby to reduce the pressure and temperature within the jet-pipe to a desirable value.

It will be understood that difficulties are experienced in producing a simple form of adjustable nozzle capable of withstanding the high temperatures of the gases flowing within the jet-pipe 19 when the fuel supply means 20 is operative.

This invention provides an arrangement in which the need for such an adjustable nozzle is avoided and at the same time an increase in the pressure and temperature within the jet-pipe beyond a selected value is also avoided.

As has been said, part of the air delivered by the low-pressure compressor section 10 is delivered into by-pass ducting 16 and this ducting is placed in communication with the interior of the jet-pipe 19, conveniently, as shown in Figure 2, through ports 21 located in the wall of the jet-pipe between the apex of the conical structure 18b and the fuel supply means 20. The ducting 16 is also provided with an extension 16a surrounding the jet-pipe 19 and leading to an auxiliary propelling nozzle 22 adjacent the propelling nozzle 19a for the turbine exhaust gases, and means is provided to control the flow of air through the ports 21 and the propelling nozzle 22. It is arranged that when fuel is being supplied to the jet-pipe by the fuel supply means 20, the by-pass air from the ducting 16 flows in part at least into the ducting extension 16a to the auxiliary propelling nozzle 22 and thus directly to atmosphere, and that when the fuel supply means 20 is inoperative the air flowing in the by-pass ducting 16 flows through the ports 21 into the jet-pipe 19 thus mixing with the exhaust gases.

Various forms of the control means for the by-passed air flowing into ducting 16 are illustrated and referring to Figures 2 and 3, the control of flow is effected by forming the auxiliary nozzle 22 as an adjustable nozzle. The nozzle is shown as comprising a plurality of segments 22a pivotally mounted on lugs 22b on the external wall of the ducting extension 16a, and rams 23 to rock the segments 22a between the full line position shown in Figure 2 in which the outflow of by-pass air through the nozzle 22 is prevented, and a chain-line position as shown in Figure 2 in which the nozzle is open and by-pass air can flow through the ducting extension 16a direct to atmosphere. The rocking axes of the segments are indicated in chain lines in Figure 3.

With this arrangement a proportion of the by-pass air may flow through the ports 21 during operation of the fuel supply means 20.

Referring now to Figures 4 to 6, there is illustrated another arrangement of the means to control the flow of by-pass air from the by-pass ducting 16 through the ports 21 and the nozzle 22, which in this case is shown as a fixed-area nozzle. In this case the means is accommodated within the extension 16a of the by-pass ducting and comprises a ring of aerofoil blade elements 24 mounted to rotate on radially-extending spindles 24a engaged in the walls of the jet-pipe 19 and of the ducting extension 16a. As shown in Figure 5 the aerofoil blade elements 24 in one position substantially block the flow passage through the ducting extension 16a, whilst in another position shown in Figure 4 they permit by-pass air to flow from the by-pass ducting 16 into the ducting extension 16a and thus to the auxiliary nozzle 22.

The aerofoil blade elements 24 may be adjusted in any convenient manner. For instance, as shown in Figures 4 to 6, each aerofoil blade element may have supported on its radially outwardly-extending spindle 24a a bevel wheel 25 with which meshes a second bevel wheel 26 carried on a spindle 26a rotatively supported in a flange 27 on the wall of the by-pass ducting extension 16a. Each spindle 26a may also carry a pinion 28 meshing with a circular rack 29 which is coaxial with the jet-pipe 19 and rotatable about its axis. It will be seen that on rotation of the rack 29 each pinion 28 is rotated by the same angular extent and so the aerofoil blade elements 24 are adjusted simultaneously through equal angular extents (conveniently 90°).

Thus an electrical temperature sensitive element 33 (Figures 1 and 7) may be provided in the exhaust unit 18a, 18b to be sensitive to the temperature therein and this element employed to give an operating signal.

The element 33 may be a thermocouple connected to a reed 34a vibrator 34 actuated by alternating current from a generator 35 which also feeds one field coil 36a of a two-phase motor 36. The second field coil 36b is fed from an amplifier 37 energised by a transformer 38, the ends of the primary 38a of which is connected to opposed contacts 34b engaged alternately by the reed 34a. The primary 38a also has a centre tapping connected with a slider 39a of a potentiometer 39 connected across a standard voltage source 40. The voltage developed by the thermocouple 33 opposes that from the potentiometer 39 and so the amplitude and phase of the current fed to amplifier 37 and thus to the coil 36b is representative of the magnitude and nature of the voltage difference, and the direction of rotation of the motor will depend on whether or not the temperature sensed by the thermocouple 33 is below or above a value represented by the tapped voltage from the potentiometer 39. The motor 36 can be used to effect the control motion of the valves or nozzle segments or may be used to control the supply of pressure fluid say to rams 23, 31.

I claim:
1. In a turbo-pet engine having a compressor, a main combustion stage, a turbine and a reheat combustion stage in sequential flow, by-pass duct means connected at one end continuously to receive from said compressor part of the air compressed in said compressor and having at its other end an outlet to atmosphere thereby to by-pass some of the compressed air around said main combustion stage and turbine, a port connection opening from said by-pass duct means to said reheat combustion stage at a position upstream of said outlet to atmosphere, and valve means arranged to control the flow in said by-pass duct means downstream of said port connection and movable from a first position in which said valve means restricts flow of the by-passed air in said by-pass duct means downstream of said port connection and causes said by-passed air to flow into the reheat combustion stage to mix with the exhaust gases from the turbine to a second position in which said by-passed air is discharged through said outlet to atmosphere without mixing with the exhaust gases, and control means for said valve means comprising a temperature-sensitive device located in the turbine exhaust gas stream upstream of said reheat combustion stage and connected to move said valve means from said first position toward said second position when reheat is initiated.

2. In a turbo-jet engine having a compressor, a main combustion stage a turbine and a reheat combustion stage in sequential flow, by-pass duct means connected at one end continuously to receive from said compressor part of the air compressed in said compressor and having at its other end an outlet to atmosphere thereby to by-pass some of the compressed air around said main combustion stage and turbine, a port connection opening from said by-pass duct means to said reheat combustion stage at a position upstream of said outlet to atmosphere, valve means arranged to control the flow in said by-pass duct means downstream of said port connection and movable from a first position in which said valve means restricts flow of the by-pasesd air in said by-pass duct means downstream of said port connection and causes said by-passed air to flow into the reheat combustion stage to mix with the exhaust gases from the turbine to a second position in which said by-passed air is discharged through said outlet to atmosphere without mixing with the exhaust gases, and control means connected to move said valve means between said first and second positions and responsive to initiation of reheat combustion to move said valve means from said first position towards said second position.

3. A turbo-jet engine as claimed in claim 2, wherein said port connection leads to between the turbine and the reheat combustion stage whereby when said valve means is in said first position said by-passed air is caused to mix with the exhaust gases from the turbine at a point upstream of the reheat combustion stage.

4. A turbo-jet engine as claimed in claim 2, wherein said valve means comprises a variable-area propelling nozzle at said direct outlet to atmosphere from the by-pass duct means.

5. A turbo-jet engine as claimed in claim 4, wherein said variable-area propelling nozzle is adapted in said first position substantially to close-off the direct outlet to atmosphere from the by-pass duct means.

6. A turbo-jet engine as claimed in claim 2, comprising also a jet pipe which is connected to receive exhaust gases from said turbine to convey the exhaust gases to atmosphere and in which said reheat combustion stage is located, said by-pass duct means having said valve means located therein and there being free communication through said port connection between said by-pass duct means and the jet pipe at a position upstream of said reheat combustion stage.

7. A turbo-jet engine as claimed in claim 6, wherein said valve means comprises a ring of vanes within the by-pass duct means downstream of the port connection, said vanes being rotatable about radial axes.

8. A turbo-jet engine as claimed in claim 7, wherein said vanes are connected for simultaneous angular adjustment about said radial axes.

9. In a turbo-jet engine having a compressor, a main combustion stage, a turbine and a reheat combustion stage in sequential flow, by-pass duct means connected at one end continuously to receive from said compressor part of the air compressed in said compressor and having at its other end an outlet to atmosphere thereby to by-pass some of the compressed air around said main combustion stage and turbine, a port connection opening from said by-pass duct means to said reheat combustion stage at a position upstream of said outlet to atmosphere, valve means arranged to control the flow in said by-pass duct means downstream of said port connection and movable from a first position in which said valve means restricts flow of the by-passed air in said by-pass duct means downstream of said connection and causes said by-passed air to flow into the reheat combustion stage to mix with the exhaust gases from the turbine to a second position in which said by-passed air is discharged through said outlet to atmosphere without mixing with the exhaust gases, and control means connected to move said valve means between said first and second positions and responsive to a change of operating conditions induced in the engine on initiation of reheat combustion to move said valve means towards said second position.

References Cited in the file of this patent
UNITED STATES PATENTS

| | | |
|---|---|---|
| 2,458,600 | Imbert et al. | Jan. 11, 1949 |
| 2,464,724 | Sédille | Mar. 15, 1949 |
| 2,569,497 | Schiesel | Oct. 2, 1951 |
| 2,599,879 | Walker | June 10, 1952 |